United States Patent [19]
Baldwin

[11] Patent Number: 4,883,926
[45] Date of Patent: Nov. 28, 1989

[54] STYLUS SWITCH

[75] Inventor: Richard R. Baldwin, Saratoga, Calif.

[73] Assignee: Hewlett-Packard Company, Palo Alto, Calif.

[21] Appl. No.: 184,513

[22] Filed: Apr. 21, 1988

[51] Int. Cl.⁴ .............................................. G08C 21/00
[52] U.S. Cl. ...................................... 178/18; 340/707; 362/118
[58] Field of Search ........................... 178/18; 340/707; 250/215, 227; 362/118

[56] References Cited

FOREIGN PATENT DOCUMENTS

WO86/04704 8/1986 Int'l Pat. Institute .............. 340/707

Primary Examiner—Stafford D. Schreyer
Attorney, Agent, or Firm—William H. F. Howard

[57] ABSTRACT

A stylus contains a switch which makes contact in response to slight radial motion of the stylus tip relative to the stylus housing. Means for emitting radiation operates in response to switch closure, thereby emitting a beam of radiation out the tip. The stylus includes an internal power source, such as one or more batteries, for operation of the means for emitting radiation. When such internal power source is capable of being recharged, the stylus may include means for external connection to the recharging supply. In another embodiment, the stylus is capable of emitting more than one type of radiation which are distinguishable, such as by wavelength, modulation type, or other convenient means. In this manner, the stylus can be controlled by the user to emit different signals, which may be interpreted by a receiving device, for example, as different colors, or as a write signal versus an erase signal. In one embodiment, such an erase signal is emitted from the opposite end of the stylus as the write signal.

27 Claims, 2 Drawing Sheets

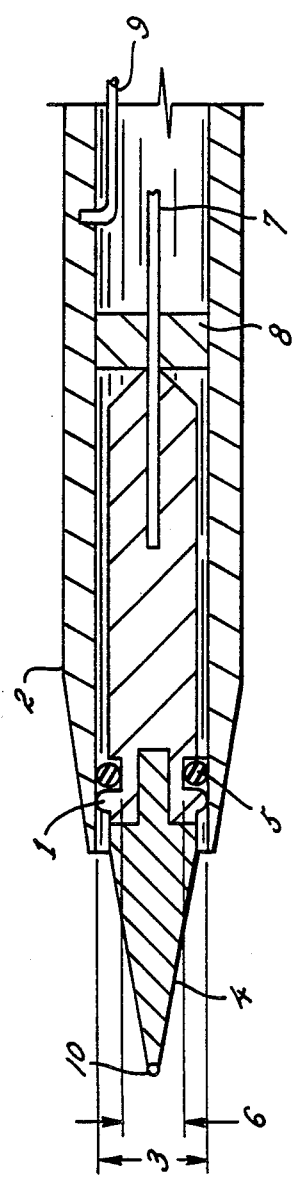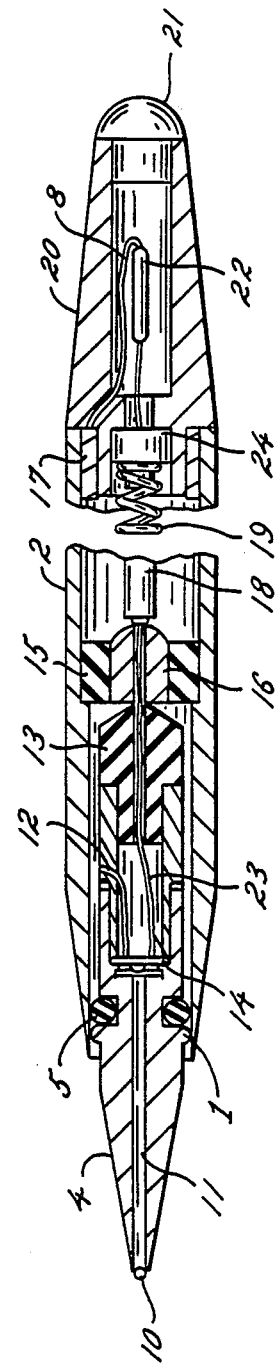
FIG. 1
FIG. 2

STYLUS SWITCH

BACKGROUND OF THE INVENTION

This invention pertains to stylus switches, for example for use with digitizing tablets and write-on image displays.

Prior art stylus switches are known for use with, for example, digitizing tablets and write-on image displays. Such prior art styli used with digitizing tablets employ a "pen down" switch which requires a noticeable pressure to actuate, and which requires considerable travel (typically about 0.01 to 0.02 inch) in order to actuate. Such a prior art stylus is generally used with a CRT monitor located some distance away from the digitizing tablet. Since the operator cannot watch the CRT and the digitizing tablet simultaneously, the stylus location is shown on the CRT by means of a cursor regardless of whether the "pen down" switch is actuated or not. The "pen down" switch is generally used only to issue a command.

Commands are issued by the operator through the stylus in two steps: First, the operator places the stylus on the digitizing tablet and moves it around until the cursor is at the desired location on the CRT. Then the operator depresses the "pen down" switch on the stylus which issues the command. For this type of application, it is useful to have a "pen down" switch which requires significant pressure and travel to actuate, since this avoids inadvertent "pen down" indication.

For an application such as a digitizer integrated with a display, there is no need for a cursor, since the display appears on the surface of the digitizing tablet. The "pen down" switch is only used to indicate that the stylus is touching the display. The stylus may be used to draw, print, write, erase, or to issue a command. In this case, the "pen down" switch should have no noticeable travel, and should require no more pressure to activate than would be required to write with a pen or pencil. Prior art styli are not suitable for this application, since the pressure required to maintain "pen down" indication causes operator fatigue Furthermore, prior art styli require the operator to hold the stylus in a substantially vertical direction in order to properly actuate the "pen-down" switch. While this may be suitable for issuing commands, it is awkward and fatiguing for the operator, and is not very practical for use when it is desired that the stylus be used to allow the computer to receive an operator's drawing or handwriting.

SUMMARY OF THE INVENTION

In accordance with the teachings of this invention, a novel stylus is provided which contains a switch which makes contact in response to slight radial motion of the stylus tip relative to the stylus housing. In one embodiment of this invention, means for emitting radiation, such as a lamp or light emitting diode, operates in response to switch closure, thereby emitting a beam of radiation ut the tip. Alternatively, the switch activates an electromagnetic coil. In one embodiment of this invention, the stylus includes an internal power source, such as one or more batteries, for operation of the means for emitting radiation. When such internal power source is capable of being recharged, the stylus may include means for external connection to the recharging supply. In another embodiment of this invention, the stylus is capable of emitting more than one type of radiation which are distinguishable, such as by wavelength, modulation type, or other convenient means. In this manner, the stylus can be controlled by the user to emit different signals, which may be interpreted by a receiving device, for example, as different colors, or as a write signal versus an erase signal. In one embodiment of this invention, such an erase signal is emitted from the opposite end of the stylus as the write signal.

BRIEF DESCRIPTION OF THE DRAWINGS

FIG. 1 is a cross-sectional view of a portion of a stylus switch constructed in accordance with one embodiment of this invention;

FIG. 2 is a cross-sectional view of another embodiment of a stylus constructed in accordance with the teachings of this invention;

FIG. 3b is a schematic diagram of the electrical connection of an external recharging supply to the circuit of FIG. 3a;

DETAILED DESCRIPTION OF THE INVENTION

Figure 4:
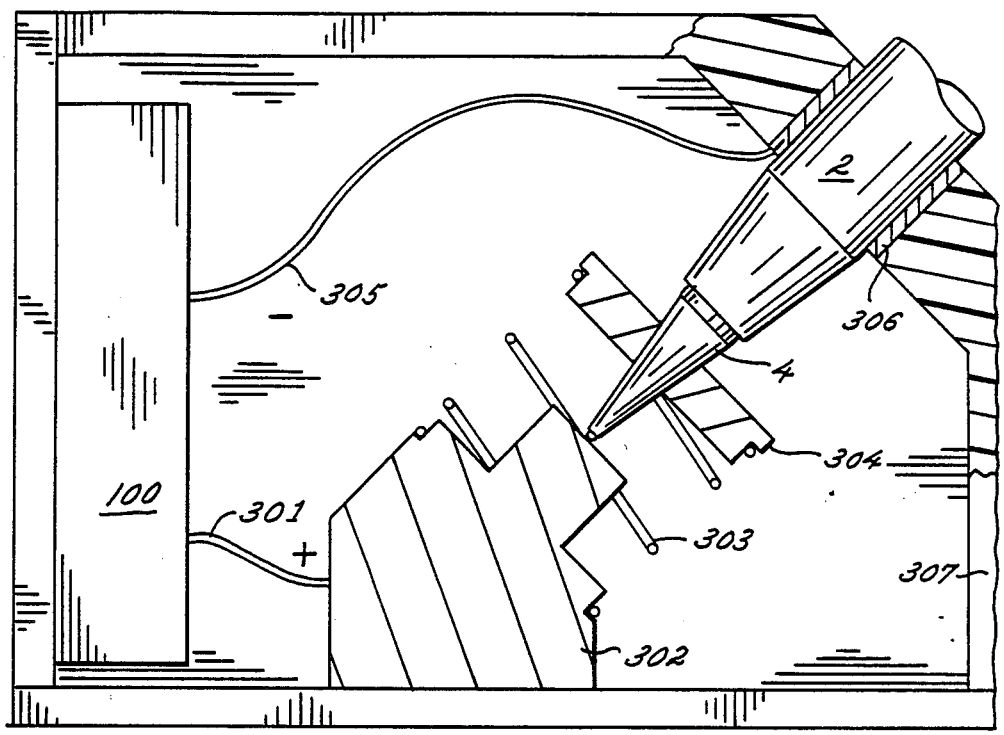
FIG. 4 depicts one embodiment of a charging system suitable for use in accordance with the teachings of this invention.

In accordance with the teachings of this invention, a stylus is provided which indicates a "pen down" switch actuated by radial motion of the stylus tip relative to the stylus housing. The amount of switch travel required is only about 0.001 inch and the pressure required to obtain switch closure is approximately 30 grams, which is comparable to the pressure required to write with a pencil. Such switch travel and pressure requirements are a significant improvement as compared to prior art styli.

The use of radial motion to operate the pen down switch, as taught by this invention, rather than the use of axial motion, as in the prior art, allows the use of a simple flexure which can easily be incorporated into a long, thin housing such as a stylus. As is known, a flexure is a simple mechanical device that allows a small amount of motion caused by bending, which allows motion to occur in a selected direction only, without friction. Furthermore, the stylus switch of this invention also takes advantage of frictional force present during writing, which is in the radial direction.

A cross-sectional view of one embodiment of a radial switch stylus constructed in accordance with the teachings of this invention is shown in FIG. 1. Pen down switch contact occurs when conductive annular ring 1 portion of stylus tip 4 touches the conductive inside diameter of stylus housing 2. The diameter 3 of the annular ring is approximately 0.002 inch smaller than the inside diameter of housing 2, requiring only about 0.001 inch radial travel of stylus tip 4 with respect to stylus housing 2 in any direction in order to cause electrical contact to be made between annular ring 1 and the conductive inside diameter of stylus housing 2, thereby causing the pen down switch to be activated. In one embodiment of this invention (FIG. 2), annular ring 1 is formed as an integral part of tip 4; in another embodiment of this invention, stylus tip 4 is an electrically insulating insert as shown in FIG. 1. In one embodiment of this invention, stylus housing 2 is itself conductive, thereby providing an inside diameter which is conductive, forming one contact of the pen down switch. In another embodiment of this invention, stylus housing 2 is made of any convenient material, and the inside of stylus housing 2 is coated with a conductive layer, serving as one contact of the pen down switch. In an alternative embodiment of this invention, stylus housing 2 is constructed of any convenient material, and an electrically conductive region is formed on the inside of stylus housing 2 surrounding that portion of stylus tip 4, thereby allowing electrical connection when stylus tip 4 is moved in the radial direction. In this embodiment, a wire or another electrically conductive trace formed on the inside of stylus housing 2 is used to connect the pen down switch contact formed on the inside of stylus housing 2 with other circuitry, described later. In alternative embodiments of this invention, annular ring 1 is not formed, or is formed as part of stylus housing 2, the important point being that a means is provided for allowing a slight radial motion of stylus tip 4 with respect to stylus housing 2 to cause closure of a pen down switch.

In another embodiment, that portion of stylus housing 2 which surrounds that portion of stylus tip 4 which serves as one contact of the pen down switch is formed of a conductive material, and the remainder of stylus tip 4 is made of any convenient material.

In the embodiment shown in FIG. 1, the switch spring pressure is determined by a VITON brand "O" ring 5 which is held in slight compression between the inside diameter of stylus housing 2 and diameter 6 of stylus tip 4. (VITON is a trademark of duPont.) Other devices can be used, or other types of "O" rings can be used, with the VITON brand selected due to its high resilience, relative inertness, and high degree of concentricity. For best operation, diameter 6 of FIG. 1 is preferably held concentric to diameter 3 to within approximately 0.0001 inch.

Electrical connection to annular ring 1 is accomplished through wire 7 which, in one embodiment, also conveniently serves as the flexure. In one embodiment, 26 or 30 gauge copper wire is used as flexure wire 7, which is suitable for use since the flexure is required to bend only about 1 milliradian (0.06°). Wire 7 passes through electrical insulator 8. The inside and outside diameters of insulator 8 are preferably concentric to within about 0.001 inch and proper alignment axis 11, as shown in FIG. 2. Preferably, wire 7 is performed in a tight fit in insulator 8, and insulator 8 is in turn performed in a tight fit in the inside diameter of stylus housing 2. Following these guidelines allows proper alignment of the components to form a suitable flexure which is advantageously used in the stylus of this invention. Furthermore, it is advantageous to cement wire 7 in insulator 8, and cement insulator 8 into stylus housing 2.

Electrical return through stylus housing is accomplished through wire 9. In one embodiment, a rotating ball 10 is located at the point of stylus tip 4, in order to provide a suitable source of friction against the display surface, thereby giving the stylus of this invention the proper "feel" to the operator, just as if the operator was using a pen or pencil. In one embodiment of this invention, ball 10 has a diameter of approximately 1 millimeter, and is formed of a very sturdy material, such as sapphire, in order to provide good wear characteristics. When sapphire is used to form ball 10, ball 10 need not rotate, since a nonrotating sapphire ball provides the user with the proper "feel" of a pen or pencil.

FIG. 2 is a cross-sectional view of one embodiment of this invention which includes means for generating light which shines out the point of stylus tip 4 to give an indication of the location of the Stylus point 10 on a digitizer, CRT screen, or the like. As in the embodiment of FIG. 1, the embodiment of FIG. 2 includes stylus housing 2, stylus tip 4, stylus point 10, O-ring 5, annular ring 1, and electrical body lead 8. Also shown in the embodiment of FIG. 2 is light source 14 mounted in the manner such that the light projects through channel 11 formed in stylus tip 4, and terminating at stylus ball point 10. In this manner, light source 14 provides light which shines through stylus point 10, giving an indication of the location of stylus point 10. Light source 14 can be made to function either continuously, thereby always giving an indication of the location of stylus point 10, or only in response to the pen down condition. In the embodiment shown in FIG. 2, light source 14 provides light only in the pen down condition. As shown in FIG. 2, lead 12 is connected between light source 14 and conductive stylus tip 4. Similarly, lead 23 is connected between the other terminal of light source 14 and one side of battery 18 by means of electrical contact 16. The opposite terminal of battery 18 is connected through battery spring 19, conductive spring retainer 24, through resistor 22 to lead 8, and in turn is connected to electrically conductive stylus body 2 through threaded connector 17. Closure of the pen down switch by radial motion of stylus tip 4 with respect to stylus housing 2 completes the circuit causing light source 14 to turn on. If desired, light source 14 may comprise, for example, a light emitting diode, in which case polarity of battery 18 is important. In one embodiment, two AAA batteries are conveniently used.

As shown in the embodiment of FIG. 2, stylus housing includes stylus housing forward portion 2 and stylus housing rear portion 20, which may be conveniently connected using suitable threads, bayonette mechanisms, or the like, allowing stylus housing pieces 4 and 20 to be opened for assembly and battery replacement. If desired, though not shown, an external plug can be used to allow electrical power to be connected, either for operating the stylus without batteries, or with dead batteries, or for recharging battery 18 either when the stylus is in use, or when the stylus is not in use. Preferably, the stylus will be operated on battery power, and recharged when not in use, thereby providing a fresh battery charge when the operator again decides to use this stylus.

Also, as shown in FIG. 2, the stylus of this embodiment includes end cap 21 and conductive ring 17. Conductive ring 17 serves to connect lead 8 of resistor 22 to conductive stylus housing 2 which can be threaded or formed as a bayonette connector, or the like, for easy attachment to end cap 21. The stylus of FIG. 2 also includes insulator material 13 and 15, thereby keeping conductive wire 23 insulated from conductive stylus housing 2. Conductive material 16 serves to provide convenient contact to the positive side of battery 18.

Figure 3A:
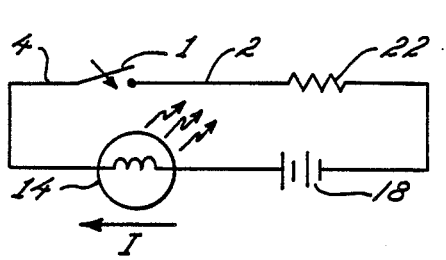
FIG. 3a depicts the electrical circuit of a stylus constructed in accordance with the teachings of this invention which utilizes a lamp.
Figure 3B:
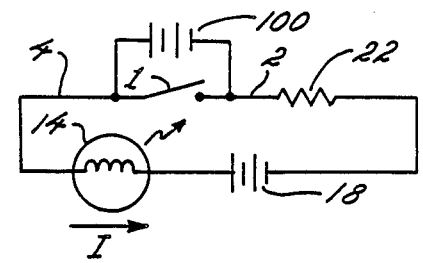

FIGS. 3a through 3d are schematic diagrams depicting various embodiments of the stylus constructed in accordance with the teachings of this invention, using similar reference numerals as used in FIG. 2. As shown in FIG. 3a, light source 14 is a lamp, and when the pen down switch is closed, current I flows from the positive terminal of battery 18, through light source 14, through stylus tip 4, through the closed pen down switch to stylus body 2, through resistor 22 (which limits current through light source 14, if desired), to the negative terminal of battery 18, thus illuminating light source 14.

If desired, a suitable holder is used, such as is shown in FIG. 4, which causes an external power source 100 to be connected such that its positive lead 301 supplies current to stylus tip 4 via electrically Conductive stop 302, electrically conductive spring 303, and electrically conductive connector 304. Negative lead 305 conducts current from stylus body 2, through electrically conductive connector 306 forming a portion of holder 307 and conducts this current to external supply 100. In this manner, a reverse current is made to flow through battery 18 (FIG. 2), thereby recharging battery 18. At this time, lamp 14 will be illuminated to the extent of the reverse charging current, although this is not important. Alternatively, means can be provided for connecting charging supply 100 to battery 18 other than through stylus tip 4 and stylus body 2, for example by means of a jack for receiving an external power plug, or electrically separate areas on stylus housing 2. In such an embodiment, it is possible to cause recharging current to be applied to battery 18 without the need for going through light source 14, or resistor 22, if desired. Of importance, since charging supply 100 is external, it can be designed in any convenient manner to allow proper charging of battery 18 either by being connected directly, or through one or both of lamp 14 and resistor 22.

Figure 3C:
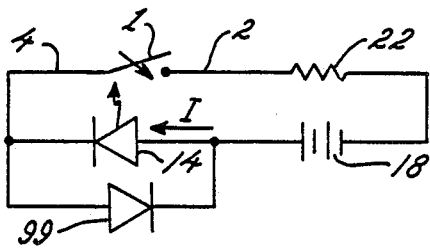
FIG. 3c is a schematic diagram of one embodiment of stylus electronics constructed in accordance with the teachings of this invention which uses a light emitting diode as a light source.
Figure 3D:
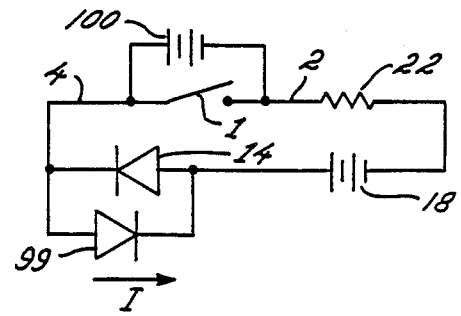
FIG. 3d is a schematic diagram of a recharging supply connected to the embodiment of FIG. 3c.

FIG. 3c shows another embodiment of this invention in which a light emitting diode (LED) or laser diode is used as light source 14. Using an LED or laser diode is preferred as compared with, for example, a lamp having a tungsten filament, which takes a significantly greater time to turn on and off. In this embodiment, of course, in order to cause LED 14 to operate properly, its anode must be connected to the positive terminal of battery 18, and its cathode must be connected to the negative lead of battery 18. When the pen down switch is closed, current flows from the positive lead of battery 18 through LED 14 to stylus tip 4, through the closed pen down switch to stylus body 2, through resistor 22, to the negative lead of battery 18, thereby illuminating LED 14. Although not required for normal operation, the schematic diagram of FIG. 3c shows diode 99 connected in parallel, but reversed from, LED 14. When the pen down switch is closed, diode 99 is reverse biased, thereby not consuming current from battery 18. However, by including diode 99, battery 18 can be conveniently recharged, for example by the use of the recharging holder of FIG. 4. As shown in FIG. 3d, when the stylus is placed in the recharging holder, external charging supply 100 has its positive lead connected to stylus tip 4, and its negative lead connected to stylus body 22. This causes current to flow from the positive lead of battery 100 through stylus tip 4 through forward biased diode 99 to the positive lead of battery 18. The negative lead of battery 18 is connected through resistor 22 to stylus body 2, thereby completing the recharge circuit. Naturally, the embodiment of FIG. 3c can have its battery 18 recharged by the use of suitable recharge jack for receiving a recharge current, as described above with regard to the embodiment of FIG. 3a. In this event, the external recharge potential can be applied to a circuit which does not include LED 14, thereby precluding the need for diode 99.

In one embodiment of this invention, optical channel 11 is provided by a one-half millimeter diameter optical fiber. Also in one embodiment of this invention, light source 14 includes a light emitting diode, for example the Hitachi part number HLP40RB. In this embodiment, battery 18 comprises two AAA batteries, and resistor 22 comprises a 13 X resistor.

In another embodiment of this invention, the stylus is capable of emitting different types of radiation, distinguishable based on wavelength, modulation characteristics or the like. This may be affected by replacing LED 14 (FIG. 2) with a plurality of light sources, for example LEDs having different wavelengths. Alternatively, the light source 14 can be modulated in a number of different ways using suitable circuitry (not shown) well known to those of ordinary skill in the art in light of the teachings of this invention. The selection of the different types of radiation can be conveniently made by an operator controlled switch (not shown) contained on the stylus. In another embodiment, a first type of radiation is emitted by light source 14, and the second type of radiation is emitted by a second light source (not shown) through end cap 21. This embodiment has the particular advantage that the light emitted through stylus tip 10 may serve as a "write" signal, as if one was writing with a pen or pencil, and the light emitted through end cap 21 can serve as an "erase" signal, as if one were using the eraser on the end of a pencil. In this embodiment, the "erase" source can be switched on by the user using an "erase" switch (not shown) on the stylus, or can be actuated using either a prior art stylus mechanism, or a stylus switch as taught by this invention.

In an alternative embodiment, light source 14 (FIG. 2) is replaced by an electromagnet which is energized by switch closure to emit a magnetic field.

All publications and patent applications are herein incorporated by reference to the same extent as if each individual publication or patent application was specifically and individually indicated to be incorporated by reference. The invention now being fully described, it will be apparent to one of ordinary skill in the art that many changes and modifications can be made thereto without departing from the spirit or scope of the appended claims.

What is claimed is:

1. A stylus switch comprising:
   a stylus housing having a first end, said first end having an opening;
   a stylus tip positioned to extend from said opening of said stylus housing;
   switch means responsive to radial movement of said stylus tip with respect to said stylus housing;
   a power source located within said stylus housing;
   signal means for providing a signal in response to said switch means wherein said signal means is located in said stylus tip and provides said signal through a signal transmission means to a point on said stylus tip.

2. A stylus switch as in claim 1 wherein said stylus tip is positioned to be insulated from said stylus housing, and said stylus tip makes electrical contact with said stylus housing in response to radial movement of said stylus tip with respect to said stylus housing.

3. A stylus switch as in claim 1 wherein said stylus housing and the same said stylus tip have substantially the same cross-section at said opening.

4. A stylus switch as in claim 3 wherein said stylus tip is positioned with respect to said stylus housing by an insulating member positioned between said stylus housing and said stylus tip.

5. A stylus switch as in claim 4 wherein said insulating member is formed as part of said stylus housing.

6. A stylus switch as in claim 4 wherein said insulating member is formed as part of said stylus tip.

7. A stylus switch as in claims 5 or 6 wherein said insulating member comprises an "O" ring.

8. A stylus switch as in claim 2 wherein said portion of said stylus tip located within said stylus housing has an outside dimension slightly less than the inside dimension of said stylus housing at a location corresponding to said outside dimension.

9. A stylus switch as in claim 8 wherein said outside dimension is approximately 0.002 inch smaller than said inside dimension.

10. A stylus switch as in claim 3 wherein said stylus housing and said stylus tip have substantially a circular cross-section within said housing near said opening.

11. A stylus switch as in claim 10 wherein said stylus tip includes an electrical contact lip extending around its circumference within said housing.

12. A stylus switch as in claim 10 wherein said electrical contact lip makes electrical contact with said housing in response to radial movement of said stylus tip with respect to said stylus housing.

13. A stylus switch as in claim 12 wherein said stylus housing further comprises an electrical contact ring surrounding said electrical contact lip.

14. A stylus switch as in claim 1 wherein said signal means comprises a light, a light emitting diode, a laser diode, or an electromagnet.

15. A stylus switch as in claim 1 wherein said signal means includes a first lead connected to said stylus head, and a second lead connected to said power source, and said signal means emits a signal when said stylus tip is electrically connected to a second lead of said power source in response to radial movement of said stylus tip with respect to said stylus head.

16. A stylus switch as in claim 1 further comprising electrical contact means for connecting an external power source to said power source located within said stylus housing.

17. A stylus switch as in claim 16 wherein said electrical contact means comprises one or more electrical contacts on said stylus housing.

18. A stylus switch as in claim 16 wherein said electrical contact means comprises one or more electrical contacts on said stylus tip.

19. A stylus switch as in claim 16 wherein said electrical contact means comprises one electrical contact on said stylus tip and one electrical contact on said stylus housing.

20. A stylus switch as in claim 1 further comprises:
a power source located within said stylus housing;
wherein said signal means serves to provide a plurality of types of signals, at least one of said types of signals being provided in response to said switch means.

21. A stylus switch as in claim 20 which further comprises:
signal selection means for selecting which signal type is to be proved in response to said switch means.

22. A stylus switch as in claim 20 wherein said signal types are differentiated by wavelength.

23. A stylus switch as in claim 20 wherein said signal types are differentiated by modulation characteristics.

24. A stylus switch as in claim 1 which further comprises second signal means for providing a second signal from an end of said stylus opposite said stylus tip.

25. A stylus switch as in claim 21 wherein said second signal means is responsive to a second switch means.

26. A stylus switch as in claim 24 wherein said signal and said second signal are differentiated by wavelength.

27. A stylus switch as in claim 24 wherein said signal and said second signal are differentiated by modulation characteristics.

* * * * *